US011104416B2

(12) United States Patent
Yvon et al.

(10) Patent No.: US 11,104,416 B2
(45) Date of Patent: Aug. 31, 2021

(54) SYSTEM FOR CONTROLLING THE PITCH OF FAN BLADES OF A TURBINE ENGINE, THE SYSTEM HAVING A FEATHERING-LOCKING PEG

(71) Applicant: SAFRAN AIRCRAFT ENGINES, Paris (FR)

(72) Inventors: Didier Jean-Louis Yvon, Moissy-Cramayel (FR); Clementine Charlotte Marie Mouton, Moissy-Cramayel (FR); Emmanuel Pierre Dimitri Patsouris, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 294 days.

(21) Appl. No.: 16/067,973

(22) PCT Filed: Jan. 4, 2017

(86) PCT No.: PCT/FR2017/050013
§ 371 (c)(1),
(2) Date: Jul. 3, 2018

(87) PCT Pub. No.: WO2017/118810
PCT Pub. Date: Jul. 13, 2017

(65) Prior Publication Data
US 2019/0009887 A1 Jan. 10, 2019

(30) Foreign Application Priority Data
Jan. 5, 2016 (FR) ...................................... 1650042

(51) Int. Cl.
*B64C 11/38* (2006.01)
*F01D 7/00* (2006.01)
(Continued)

(52) U.S. Cl.
CPC ............ *B64C 11/385* (2013.01); *B64D 27/16* (2013.01); *F01D 7/00* (2013.01); *F04D 29/323* (2013.01);
(Continued)

(58) Field of Classification Search
CPC .......... F01D 7/00; F01D 21/00; F01D 21/003; F01D 21/006; F05D 2260/90;
(Continued)

(56) References Cited

U.S. PATENT DOCUMENTS 2,872,986 A 2/1959 Cartwright
3,439,745 A * 4/1969 Gaubis ................. B64C 11/385
416/46
(Continued)

FOREIGN PATENT DOCUMENTS

WO WO 2010/130893 A1 11/2010

OTHER PUBLICATIONS

International Search Report dated Apr. 24, 2017 in PCT/FR2017/050013 filed Jan. 4, 2017.

*Primary Examiner* — Courtney D Heinle
*Assistant Examiner* — Michael K. Reitz
(74) *Attorney, Agent, or Firm* — Oblon, McClelland, Maier & Neustadt, L.L.P.

(57) ABSTRACT

A system for controlling the pitch of fan blades of a turbine engine propeller, the system including an actuator secured to a casing of the turbine engine, having a movable portion that is movable in translation relative to the casing, the movable portion being mechanically coupled to a load transfer bearing having an outer ring that is coupled to fan blade pivots so that a movement in translation of the movable portion of the actuator leads to a change in the pitch angle of the fan blades, and at least one locking peg secured to the casing of the turbine engine and suitable, in the event of the actuator (Continued)

malfunctioning, for mechanically locking the load transfer bearing in a position wherein the fan blades are feathered.

14 Claims, 5 Drawing Sheets

(51) Int. Cl.
  *F04D 29/32* (2006.01)
  *F04D 29/36* (2006.01)
  *B64D 27/16* (2006.01)
  *B64D 27/00* (2006.01)

(52) U.S. Cl.
  CPC ........ *B64D 2027/005* (2013.01); *F04D 29/36* (2013.01); *F05D 2220/323* (2013.01); *F05D 2220/36* (2013.01); *F05D 2240/14* (2013.01); *F05D 2260/57* (2013.01); *F05D 2260/70* (2013.01); *F05D 2260/74* (2013.01); *Y02T 50/60* (2013.01)

(58) Field of Classification Search
  CPC ... F05D 2270/46; B64C 11/30; B64C 11/305; B64C 11/32; B64C 11/325; B64C 11/34; B64C 11/36; B64C 11/38; B64C 11/385; B64C 11/40; B64C 11/42
  See application file for complete search history.

(56) References Cited

U.S. PATENT DOCUMENTS

| | | | | |
|---|---|---|---|---|
| 3,873,235 | A * | 3/1975 | Mendelson | ............... F01D 7/00 416/154 |
| 3,893,789 | A * | 7/1975 | Andrews | ................... F01D 7/00 416/160 |
| 6,811,376 | B2 * | 11/2004 | Arel | ........................ B64C 11/38 416/155 |
| 2012/0093652 | A1 | 4/2012 | Belmonte et al. | |

* cited by examiner

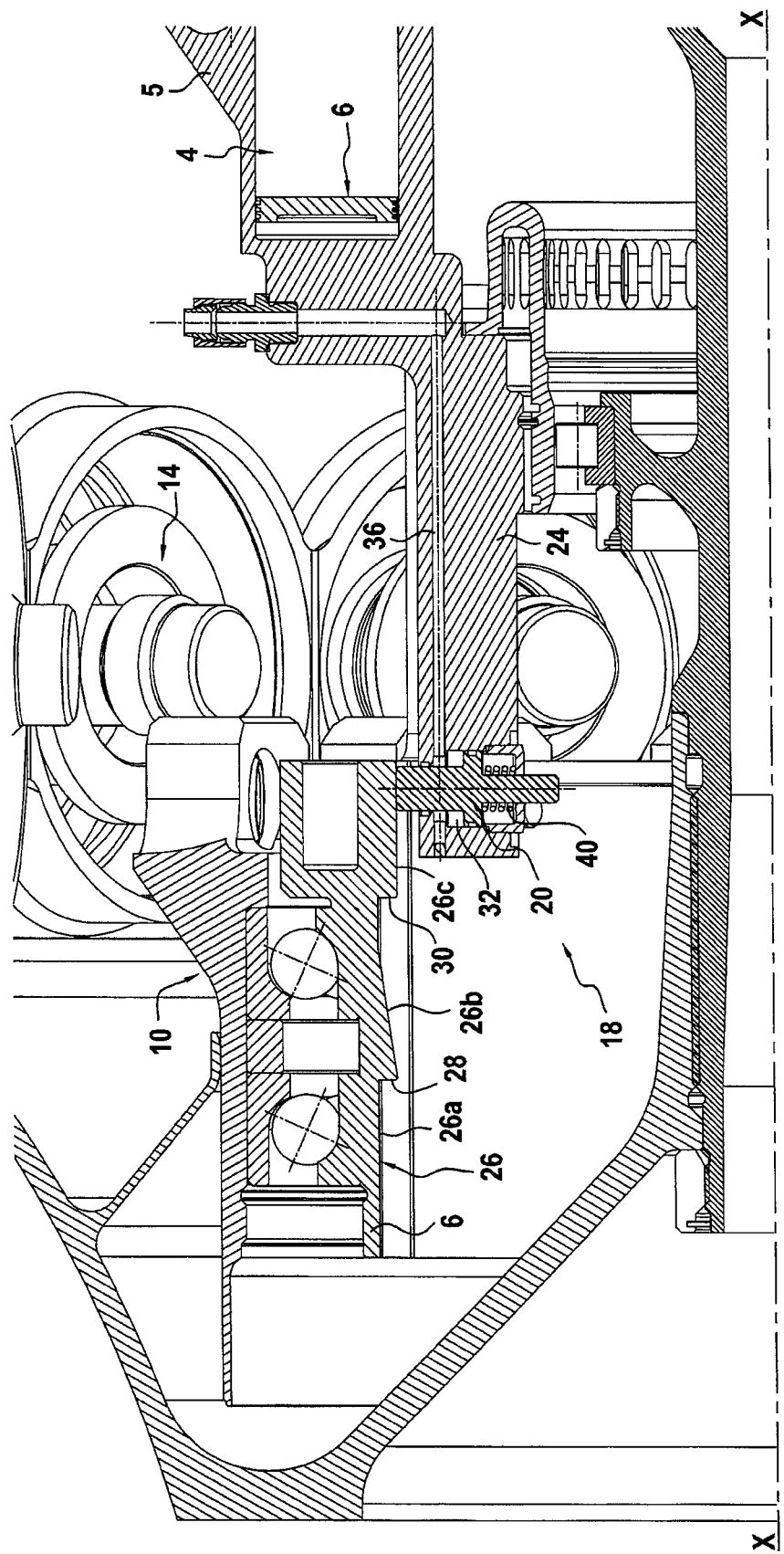

SYSTEM FOR CONTROLLING THE PITCH OF FAN BLADES OF A TURBINE ENGINE, THE SYSTEM HAVING A FEATHERING-LOCKING PEG

BACKGROUND OF THE INVENTION

The present invention relates to the general field of turbine engines having one or two optionally ducted fans, and more particularly to controlling the pitch of the fan blades in such turbine engines.

A preferred field of application of the invention lies with turbojets having contrarotating propellers, also known as "open rotors", comprising two contrarotating propellers, placed downstream (in a "pusher" configuration) or upstream (in a "puller" configuration) of the gas generator. Nevertheless, the invention also applies to turboprops having one or more propulsive propellers.

In a turbojet with one or more propellers, it is known that the pitch (or orientation) of the blades constituting such propellers constitutes one of the parameters enabling the thrust of the turbojet to be managed, in particular by causing the propeller to operate always under the best possible conditions. Specifically, the speed of the propellers is also constant during all stages of flight, and it is the pitch angle of the propeller blades that serves to vary thrust. Thus, during a stage of cruising flight, it is desired to obtain the lowest possible power on the turbine shaft that is compatible with given traction at a given airplane speed, so as to obtain the best efficiency (i.e. the efficiency that serves to minimize fuel consumption and increase range). Conversely, on take-off, the highest possible traction is sought in order to cause the airplane to accelerate and then take off.

Varying the pitch of propeller blades requires certain safety measures to be taken in order to ensure that the blades do not remain blocked in certain positions, in particular as a result of a malfunction of the systems for controlling their pitch. For example, under their own centrifugal effect, the blades tend to take up a flat pitch position that corresponds to a pitch angle in which their chords make an angle of 90° with the axis of rotation of the propeller. However, a blade blocked in this flat position generates little resistive torque and runs the risk of overspeeding, with the resulting danger of losing a blade and/or the rotary hub carrying it.

In order to remedy that problem, it is known to install a device that, in the event of a failure of the control system, serves to force the blades to move into the feathered position and to hold them there (the feathered position corresponds to the blades having a pitch angle such that the chords of the blades are in alignment with the axis of rotation of the propeller, thereby reducing the drag that they generate).

Known devices for feathering fan blades (and for holding them in the feathered position) generally rely on using counterweights that make use of the centrifugal force applied by the rotation of the rotor on which they are installed to bring the blades into the feathered position in the event of a failure of the blade pitch control system.

The specification for designing such counterweights requires using an equivalent inertia about the axis of rotation of the propeller that is (at least) 2.1 times the inertia of the blades. With such a constraint, it can easily be understood that that type of feathering device leads to a large amount of additional weight on the turbine engine, increasing its overhang weight and offsetting its center of gravity.

Furthermore, it is known to seek to reduce the bulk of unducted fan turbine engines in order to reduce their length and bring the center of gravity closer to their airplane mounts. This constraint leads to greatly limiting the space available within the turbine engine. Given the inertia needed for feathering blades with counterweights, the counterweights occupy a large amount of space that needs to be found inside the turbine engine. Unfortunately, on open rotor engines, such counterweights are generally housed at the pivots of the fan blades. Thus, for engines presenting a small hub ratio, integrating such counterweights at the pivots of the blades becomes complicated. Likewise, if they are to be installed inside the turbine engine, their installation radius needs to be smaller, and that would require weights that are even greater.

OBJECT AND SUMMARY OF THE INVENTION

A main object of the present invention is thus to propose a device for feathering fan blades that does not present the above-mentioned drawbacks.

In accordance with the invention, this object is achieved by a system for controlling the pitch of fan blades of a turbine engine propeller, the system comprising:

an actuator secured to a casing of the turbine engine, having at least one movable portion that is movable in translation relative to said casing, the movable portion of the actuator being mechanically coupled to a load transfer bearing (LTB) having an outer ring that is coupled to fan blade pivots so that a movement in translation of the movable portion of the actuator leads to a change in the pitch angle of said fan blades; and at least one locking peg secured to the casing of the turbine engine and suitable, in the event of the actuator malfunctioning, for mechanically locking the LTB in a position in which the fan blades are feathered.

The term "actuator secured to a casing of the turbine engine" is used herein to mean that the cylinder of the actuator or the rod of the actuator is stationary relative to the casing of the turbine engine. In normal operation of the actuator, the pitch of the fan blades is controlled by the actuator having its movable portion move the load transfer rolling bearing in order to allow the fan blades to pivot freely. In this situation, the locking peg is in a position that does not enable it to impede the movable portion of the actuator from moving. In the event of the blade pitch control actuator malfunctioning, the locking peg is moved into a position that enables it to lock movement in translation of the LTB mechanically, once the LTB has been taken to the position for feathering the fan blades.

Thus, merely by using a locking peg, the system of the invention makes it possible to lock the blades mechanically in the feathered position in the event of the blade pitch control actuator malfunctioning. In particular, no counterweight is needed to perform this function, thus constituting a significant saving in weight. Furthermore, the overall size of the system of the invention is reduced, in particular because the locking peg can easily be received inside the LTB.

Preferably, the locking peg is suitable for occupying two different positions: an extended position in which it bears radially against an inside surface of an inner ring of the LTB, and a retracted position in which it does not bear against said inner ring of the LTB.

Under such circumstances, in the extended position, the locking peg is advantageously suitable for bearing radially against various different ramps of a longitudinal groove formed in the inside surface of the inner ring of the LTB, said ramps comprising at least one first ramp corresponding to putting the blades in a feathered position and at least one second ramp corresponding to putting the blades into a thrust reversal position.

The system may further comprise hydraulic means for holding the locking peg in the retracted position during normal operation of the actuator, and mechanical means for holding the locking peg in the extended position in the event of the actuator malfunctioning. These hydraulic means preferably also constitute a power supply for the actuator.

Also preferably, the system further comprises an auxiliary power supply suitable for bringing the movable portion of the actuator into the fan blade feathered position in the event of the actuator malfunctioning, the locking peg then bearing radially against the blade feathering ramp in order to hold said movable portion of the actuator mechanically in this position.

From upstream to downstream, the ramps in the inner ring of the load transfer rolling bearing may comprise the following distribution of ramps: the first ramp corresponding to the blades in the feathered position; an intermediate ramp; and the second ramp corresponding to the blades in the thrust reversal position.

Under such circumstances, the first ramp and the intermediate ramp may be separated by an upstream abutment, the intermediate ramp and the second ramp may be separated by a downstream abutment, and the intermediate ramp may present a slope that is inclined downstream relative to a longitudinal axis of the actuator.

The invention also provides a turbine engine including at least one set of adjustable-pitch fan blades and a fan blade pitch control system as defined above.

BRIEF DESCRIPTION OF THE DRAWINGS

Other characteristics and advantages of the present invention appear from the following description made with reference to the accompanying drawings, which show an embodiment having no limiting character. In the figures:

FIGS. 4A to 4C are section views of the system of FIGS. 2 and 3 in different pitch angle positions of the fan blades.

DETAILED DESCRIPTION OF THE INVENTION

The invention applies to any turbine engine having at least one ducted or unducted fan, and in which the propeller blades (for an unducted fan) or the fan blades (for a ducted fan) are fitted with a pitch-changer system.

The invention applies in particular to turboprops having one or more propulsive propellers, and also to open rotor turbojets that have either one propeller (and a variable pitch stator for an unducted single fan (USF)), or else two contrarotating propellers, that may be located upstream (in a "puller" configuration) or downstream (in a "pusher" configuration) of the gas generator. The invention also applies to ducted-fan turbine engines.

The architecture of these types of turbine engine is well known to the person skilled in the art and it is not described in greater detail herein. Briefly, such turbine engines have one or more propellers (for an unducted fan engine) or a fan (for a ducted fan engine) each made up of a set of variable pitch fan blades, i.e. blades of orientation that can be modified by means of a system for controlling blade pitch, as described below.

In the description below, the terms "propeller" and "propeller blade" are used interchangeably since the invention applies to an unducted fan engine or to a ducted fan engine (in which case the propeller corresponds to the fan of the engine and the propeller blades correspond to the fan blades).

A turbine engine propeller is made up of a set of optionally independent variable pitch fan blades, i.e. blades of orientation that can be modified by means of a blade pitch control system.

Figure 1:
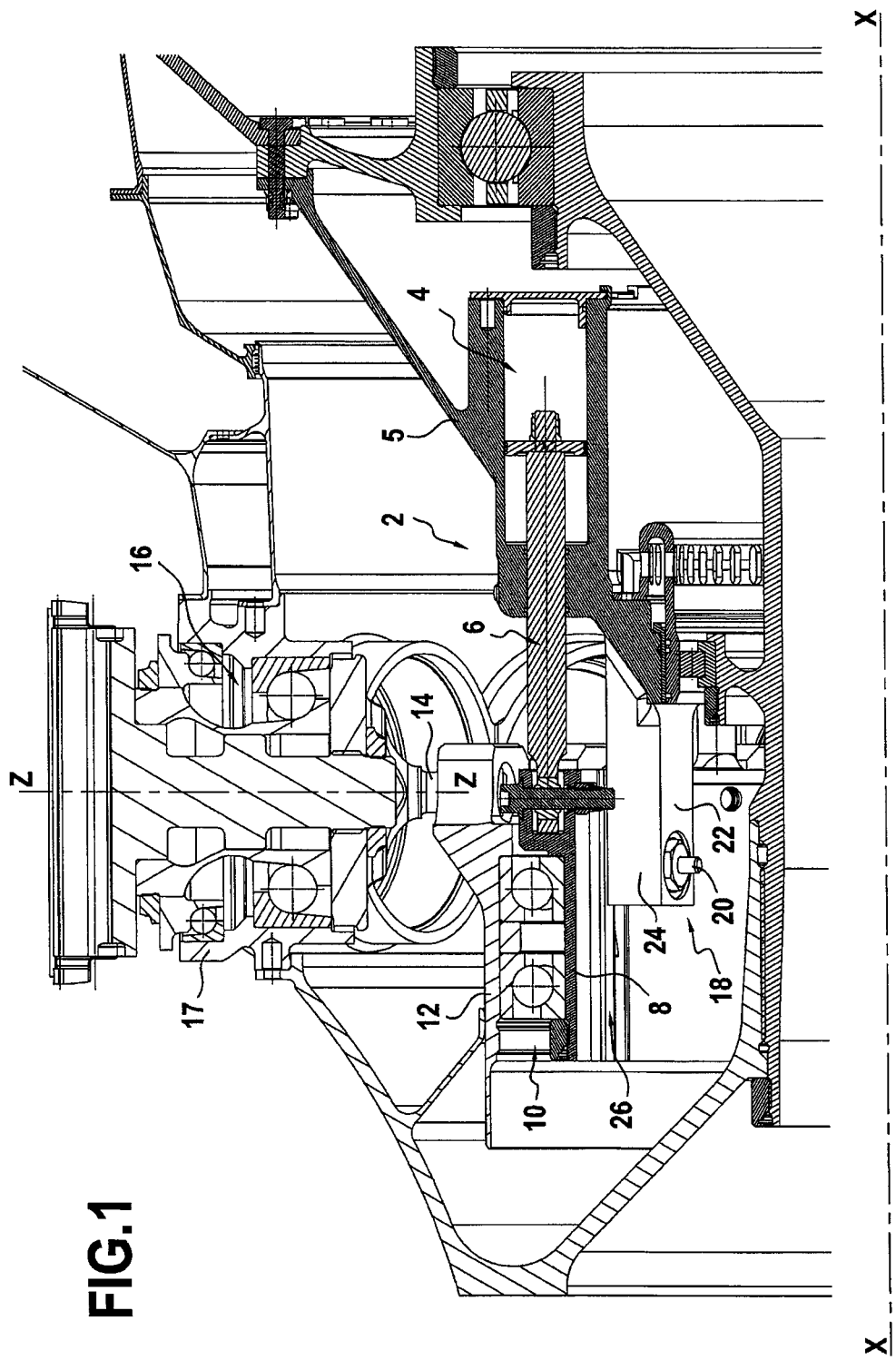
FIG. 1 is a section view showing an example installation of the system of the invention.

As shown in FIG. 1, this control system may comprise an axial actuator 2 centered on the axis of rotation of the propellers of the turbine engine and stationary relative to the structures of the engine.

More precisely, the actuator 2 comprises a cylinder 4 secured to a casing 5 of the turbine engine and a plurality of rods 6 (i.e. movable portions) that can move axially in translation in synchronized manner when the actuator is actuated (by means of a hydraulic circuit). At their free ends, the rods 6 are connected to the inner ring 8 of a load transfer bearing (LTB) 10 having its outer ring 12 coupled via lever arms 14 to pivots 16 of fan blades of the propeller mounted on a rotary annulus 17 centered on the axis of rotation X-X of the propellers.

As a result, when the actuator 2 is actuated, the rods 6 move in translation so as to move the LTB 10, thereby causing the pivots 16 of the fan blades to pivot about their respective radial axes Z-Z, thus changing their orientation (or pitch angle).

In normal operation, the fan blades can thus occupy different pitch angles, e.g. lying in the range 0° to 120° relative to the axis of rotation X-X of the propeller. A pitch angle of 0° constitutes feathering the blades, as is desirable in the event of a malfunction of the turbine engine, since that is the position that applies least stress on the turbine engine and the aircraft (the drag from the blades in this position is minimized). At the opposite extreme, a pitch angle of 120° constitutes a thrust reversal position.

Finally, under their own centrifugal effect, the blades may tend to take up an intermediate pitch angle of 90° relative to the axis of rotation of the propeller (referred to as a "flat" position). Unfortunately, a fan locked in this flat position generates little resistive torque and runs the risk of leading to overspeeding, with the accompanying risk of losing the blade and/or the rotary hub carrying it, and thus leading to a loss of control of the aircraft.

It should be observed that it is possible to have an opposite configuration in which the actuator rods are secured to the casing of the turbine engine and the actuator cylinder is movable (i.e. it is the movable portion) relative to the actuator rods.

In the invention, a device 18 is provided that serves, in the event of a malfunction (i.e. a failure) of the blade pitch control actuator, to bring the blades into the feathered position and to hold them in this position, so as to prevent them from going into the flat position, in particular.

This device includes at least one locking peg 20, which is mounted in an orifice 22 formed in a strip 24 of the casing 5 of the turbine engine that carries the cylinder 4 of the actuator. This orifice 22, which receives the locking peg, is situated facing the inside surface of the inner ring 6 of the LTB, and more precisely facing a longitudinal groove 26 formed in the inside surface of this ring and extending parallel to the axis X-X.

Figure 2:
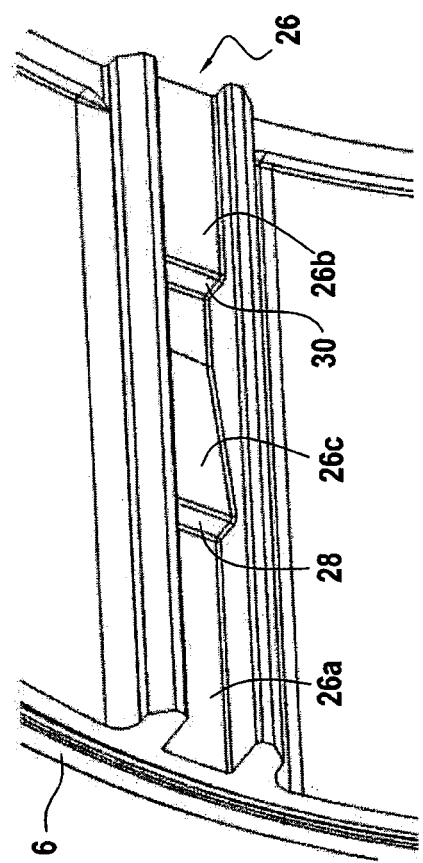
FIG. 2 is a fragmentary view of an inner ring of the load transfer bearing in an embodiment of the system of the invention.

As shown in FIG. 2, the groove 26 is notched so as to define longitudinally a plurality of ramps, specifically: a first ramp 26*a* situated at the upstream end of the groove and corresponding to feathering the blades, a second ramp 26*b* situated at the downstream end of the groove and corresponding to putting the blades into a thrust reversal position, and an intermediate ramp 26*c* formed between the first and second ramps. The intermediate ramp 26*c* presents a slope that is inclined downstream relative to the axis X-X, while the first and second ramps 26*a* and 26*b* may be substantially plane (relative to that axis). Finally, the first ramp 26*a* and the intermediate ramp 26*c* are separated by an upstream abutment 28, while the intermediate ramp and the second ramp 26*b* are separated by a downstream abutment 30. The roles of these abutments are described in greater detail below when describing the operation of the device.

The number of grooves 26 formed in the inside surface of the inner ring 6 of the LTB corresponds to the number of locking pegs 20. By way of example, there may be three grooves 26 that are regularly distributed around the longitudinal axis X-X.

Figure 3:
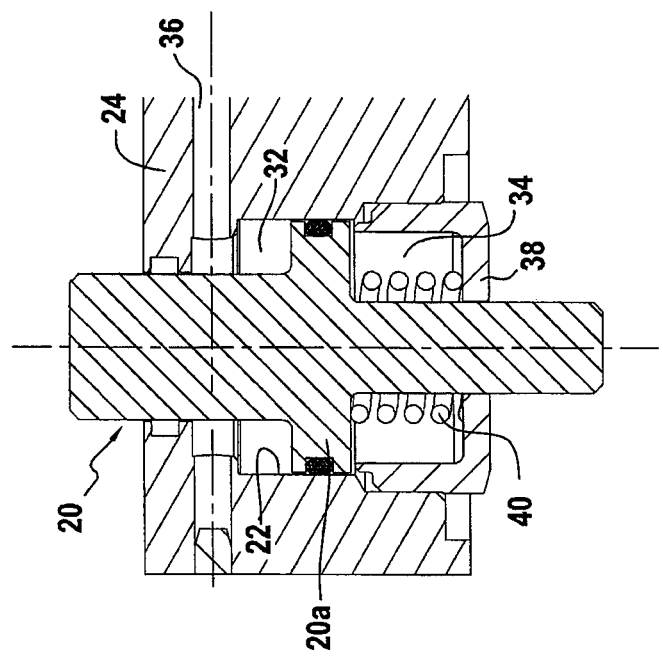
FIG. 3 is a section view of a locking peg in an embodiment of the system of the invention.

FIG. 3 shows in greater detail a locking peg 20 suitable for co-operating with one of these grooves.

As mentioned above, the locking peg 20 is received in a cylindrical orifice 22 formed in a strip 24 of the casing of the turbine engine that carries the cylinder of the blade pitch control actuator.

The locking peg 20 has an annular collar 20*a* that subdivides the orifice 22 into an upper chamber 32 and a lower chamber 34. The upper chamber 32 is in communication with a duct 36 of a hydraulic circuit for controlling the actuator. The lower chamber 34 is closed by a nut 38 for radially blocking the peg and it includes a spring 40 around the locking peg and exerting a force on the collar tending to extend it outwards.

Figure 4B:
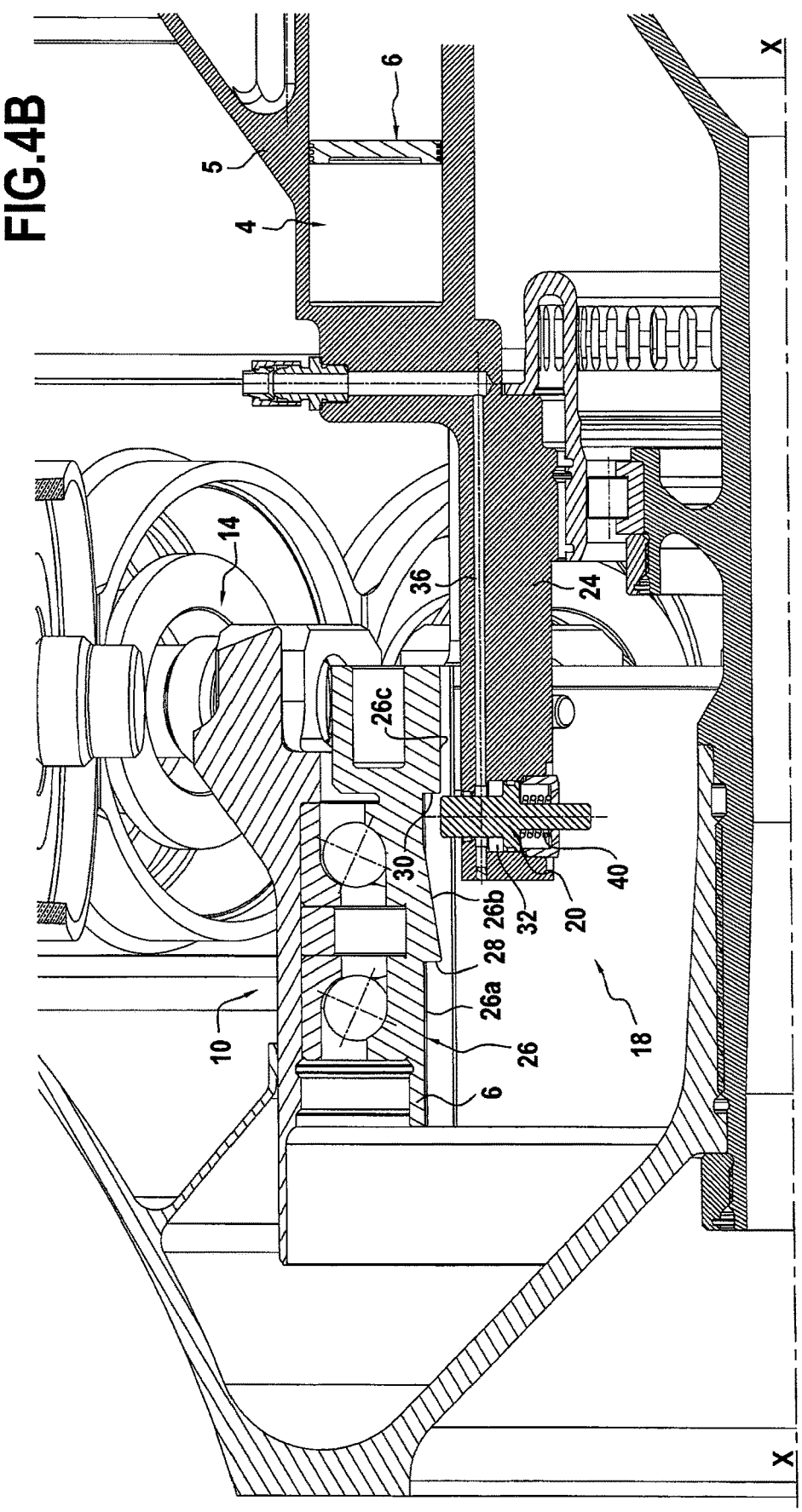

The extension force of the spring 40 is predefined in such a manner that when the fluid of the hydraulic circuit is admitted into the upper chamber 32 (via the duct 36) and exerts pressure on the collar 20*a* of the locking peg 20, the spring is compressed and the locking peg occupies a "retracted" position in which it does not bear radially against any of the ramps of the groove formed in the inner ring of the LTB (as shown in FIGS. 4A and 4B).

Figure 4C:
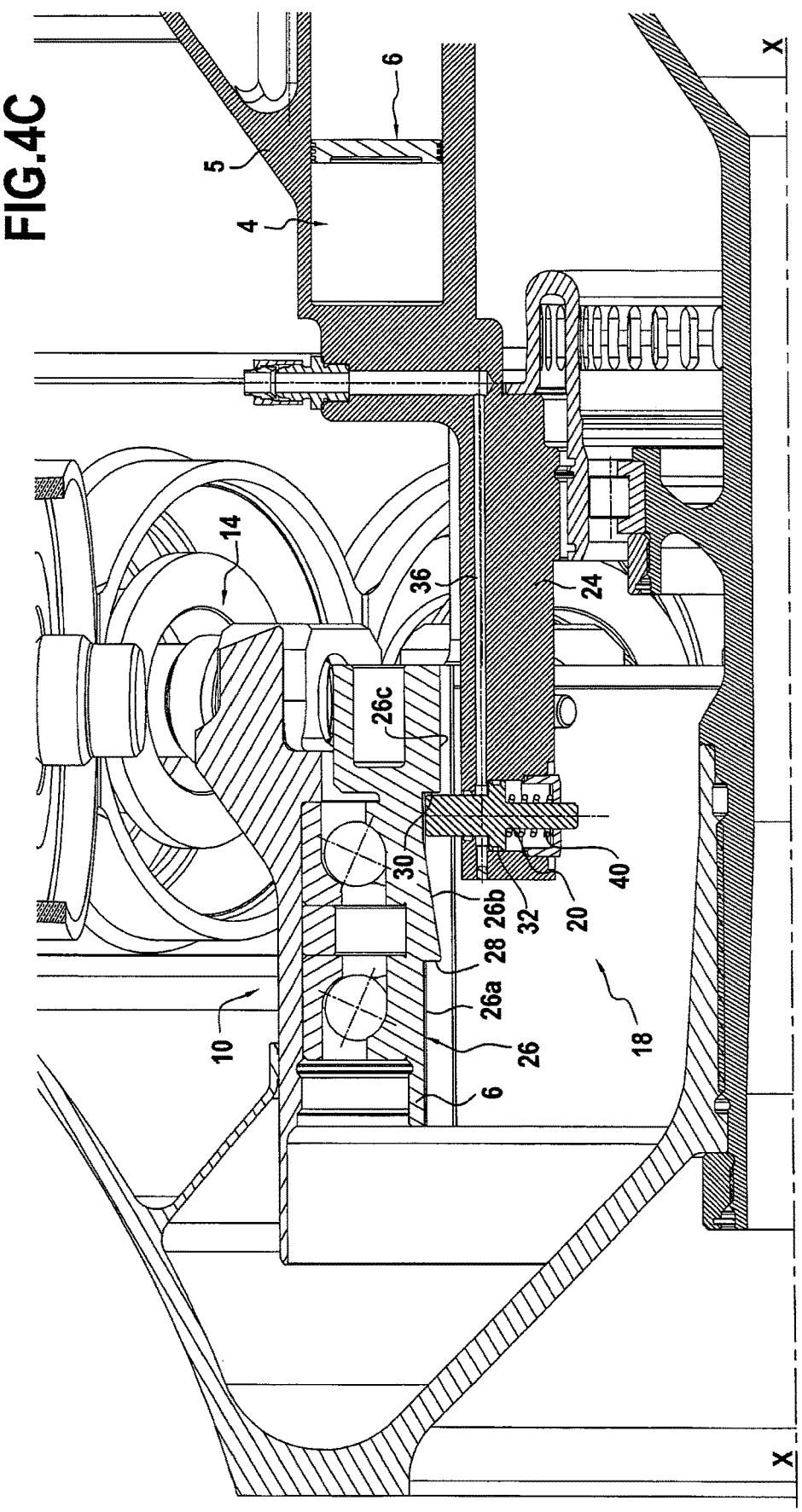

Conversely, when the pressure exerted by the fluid inside the upper chamber 32 decreases, the extension force of the spring 40 pushes the locking peg (via its collar) outwards so as to hold it in an "extended" position in which it bears radially against one of the ramps of the groove formed in the inner ring of the LTB (as shown in FIG. 4C).

The operation of the device of the invention is as follows.

In normal operation of the blade pitch control actuator 2 (FIGS. 4A and 4B), the hydraulic circuit serves to cause the rod 4 of the actuator to move, which in turn causes the LTB 10 to move in translation in order to obtain the pitch angle desired for the fan blades (via the lever arms 14 and the pivots 16).

In this situation, the upper chamber 32 of the orifice 22 is fed with fluid under pressure via the duct 36, such that the locking peg 20 occupies the retracted position and thus does not impede movement of the LTB. The pitch angle of the fan blades can thus be varied freely. Thus, FIG. 4A corresponds to a thrust reversal position for the fan blades (120° relative to the axis of rotation of the propeller), and FIG. 4B corresponds to an intermediate pitch angle between the thrust reversal position and the feathered position of the blades.

In the event of the blade pitch control actuator 2 malfunctioning, the pressure of the fluid inside the upper chamber 32 decreases so that it is no longer capable of opposing the extension force of the spring 40. The spring then pushes the locking peg 20 into the extended position and holds it in this position.

In the extended position, the locking peg 20 bears radially against the ramp of the inner ring 6 of the LTB that is facing the locking peg.

Thus, as shown in FIG. 4C, the pitch angle of the fan blades at the time the actuator 2 malfunctions was in an intermediate position between the feathered position and the thrust reversal position, i.e. the locking peg was situated facing the intermediate ramp 26*c*.

Initially, the blades have a natural tendency to return towards their flat position under the effect of their own centrifugal force, and in their rotary movement they cause the LTB to move in translation in the upstream direction (going from FIG. 4A to 4C). During this movement in translation, the locking peg 20 slides along the slope formed by the intermediate ramp 26*c* in order to come axially into abutment against the downstream abutment 30 of the groove 26 (as shown in FIG. 4C).

In this position, the locking peg prevents the LTB from moving further upstream, so as to prevent the blades from moving into the flat position under the effect of centrifugal force.

Thereafter, an auxiliary power supply (not shown in the figures) acts on the actuator 2 in order to bring the rod 6 into a position corresponding to the blades being feathered. In the example shown in FIGS. 4A to 4C, this feathered position corresponds to the rod occupying a completely downstream position. The term "auxiliary power supply" is used to mean any source of energy (electrical, hydraulic, mechanical, etc.) that is distinct from the hydraulic circuit for actuating the blade pitch control actuator.

The downstream movement of the rod of the actuator causes the LTB to move, thereby enabling the locking peg to be moved downstream relative thereto. The peg then slides along the slope formed by the intermediate ramp 26*c* in order to go past the upstream abutment 28. Once the peg has gone past this upstream abutment, the auxiliary power supply is switched off.

In this position, which is not shown in the figures, the LTB is in a position corresponding to the fan blades being feathered and the locking peg serves to hold it there. Specifically, by coming into abutment against the upstream abutment 28, the locking peg serves to counter the effect of centrifugal force on the blades tending to drive the LTB upstream.

It should be observed that the locking peg holding the blades in the feathered position in this way does not require any source of energy (the holding being achieved by mechanical abutment). In addition, the auxiliary power supply that brings the blades into this feathered position is short-lasting and may be switched off as soon as the locking peg has gone past the upstream abutment in the groove in the inner ring of the LTB. The dimensioning of this auxiliary power supply can thus be less constraining than it would be if it needed to hold this position, which means it can be of smaller weight.

The invention claimed is:

1. A system for controlling the pitch of fan blades of a turbine engine propeller, the system comprising:

an actuator secured to a casing of the turbine engine, said actuator having a stationary portion relative to the casing of the turbine engine and a movable portion that is movable in translation relative to said casing, the movable portion being mechanically coupled to a load transfer bearing having an outer ring that is coupled to fan blade pivots so that a movement in translation of the movable portion of the actuator is configured to pivot the fan blades and control the pitch angle of said fan blades; and at least one locking peg secured to the casing of the turbine engine and suitable, in the event of the actuator malfunctioning, for mechanically locking the load transfer bearing in a position in which the fan blades are feathered, and wherein the locking peg is suitable for occupying two different positions: an extended position in which it bears radially against an inside surface of an inner ring of the load transfer bearing, and a retracted position in which it does not bear against said inner ring of the load transfer bearing and the at least one locking peg is mounted in an orifice formed in a strip of the casing of the turbine engine.

2. The system according to claim 1, wherein, in the extended position, the locking peg is suitable for bearing radially against various different ramps of a longitudinal groove formed in the inside surface of the inner ring of the load transfer bearing, said ramps comprising at least one first ramp corresponding to putting the blades in a feathered position and at least one second ramp corresponding to putting the blades into a thrust reversal position.

3. The system according to claim 1, wherein, from upstream to downstream, the ramps in the inner ring of the load transfer rolling bearing comprise the following distribution of ramps: the first ramp corresponding to the blades in the feathered position; an intermediate ramp; and the second ramp corresponding to the blades in the thrust reversal position.

4. The system according to claim 3, wherein the first ramp and the intermediate ramp are separated by an upstream abutment, the intermediate ramp and the second ramp are separated by a downstream abutment, and the intermediate ramp presents a slope that is inclined downstream relative to a longitudinal axis of the actuator.

5. The turbine engine including at least one set of adjustable pitch fan blades and a system for feathering fan blades according to claim 1.

6. The system according to claim 1, wherein the orifice is situated facing an inside surface of the inner ring of the load transfer bearing.

7. The system according to claim 6, wherein the orifice faces a longitudinal groove formed in the inside surface of the inner ring and extending parallel to a longitudinal axis of the actuator.

8. A system for controlling the pitch of fan blades of a turbine engine propeller, the system comprising:

an actuator secured to a casing of the turbine engine, said actuator having a stationary portion relative to the casing of the turbine engine and a movable portion that is movable in translation relative to said casing, the movable portion being mechanically coupled to a load transfer bearing having an outer ring that is coupled to fan blade pivots so that a movement in translation of the movable portion of the actuator is configured to pivot the fan blades and control the pitch angle of said fan blades; and at least one locking peg secured to the casing of the turbine engine and suitable, in the event of the actuator malfunctioning, for mechanically locking the load transfer bearing in a position in which the fan blades are feathered, and wherein the locking peg is suitable for occupying two different positions: an extended position in which it bears radially against an inside surface of an inner ring of the load transfer bearing, and a retracted position in which it does not bear against said inner ring of the load transfer bearing and the system further comprising hydraulic circuit for holding the locking peg in the retracted position during normal operation of the actuator, and a spring mechanism for holding the locking peg in the extended position in the event of the actuator malfunctioning and the locking peg is received in an orifice of the casing, which orifice comprises an upper chamber in communication with a hydraulic circuit and a lower chamber having a spring suitable for holding the locking peg in the extended position in the event of the actuator malfunctioning.

9. The system according to claim 8, wherein, in the extended position, the locking peg is suitable for bearing radially against various different ramps of a longitudinal groove formed in the inside surface of the inner ring of the load transfer bearing, said ramps comprising at least one first ramp corresponding to putting the blades in a feathered position and at least one second ramp corresponding to putting the blades into a thrust reversal position.

10. The system according to claim 9, wherein, from upstream to downstream, the ramps in the inner ring of the load transfer bearing comprise the following distribution of ramps: the first ramp corresponding to the blades in the feathered position; an intermediate ramp; and the second ramp corresponding to the blades in the thrust reversal position.

11. The system according to claim 10, wherein the first ramp and the intermediate ramp are separated by an upstream abutment, the intermediate ramp and the second ramp are separated by a downstream abutment, and the intermediate ramp presents a slope that is inclined downstream relative to a longitudinal axis of the actuator.

12. A turbine engine including at least one set of adjustable pitch fan blades and a system for feathering fan blades according to claim 8.

13. The system according to claim 8, wherein the hydraulic circuit also constitutes a power supply of the actuator.

14. The system according to claim 8, further comprising an auxiliary power supply suitable for bringing the movable portion of the actuator into the fan blade feathered position in the event of the actuator malfunctioning, the locking peg then bearing radially against the first ramp in order to hold said movable portion of the actuator mechanically in this position.

* * * * *